(12) United States Patent
Gartner et al.

(10) Patent No.: US 12,275,274 B2
(45) Date of Patent: Apr. 15, 2025

(54) QUENCHING A WHEEL COMPRISING A HUB

(71) Applicant: Mubea Performance Wheels GmbH, Salzburg (AT)

(72) Inventors: Josef Gartner, Mining (AT); Christoph Angermeier, Falkenberg (DE)

(73) Assignee: Mubea Performance Wheels GmbH, Salzburg (AT)

( * ) Notice: Subject to any disclaimer, the term of this patent is extended or adjusted under 35 U.S.C. 154(b) by 622 days.

(21) Appl. No.: 17/603,117

(22) PCT Filed: Apr. 17, 2020

(86) PCT No.: PCT/EP2020/060874
§ 371 (c)(1),
(2) Date: Oct. 12, 2021

(87) PCT Pub. No.: WO2020/212578
PCT Pub. Date: Oct. 22, 2020

(65) Prior Publication Data
US 2022/0185012 A1 Jun. 16, 2022

(30) Foreign Application Priority Data
Apr. 17, 2019 (EP) .................................. 19169954

(51) Int. Cl.
*B60B 1/06* (2006.01)
*B60B 3/02* (2006.01)
(Continued)

(52) U.S. Cl.
CPC .............. *B60B 21/023* (2013.01); *B60B 1/06* (2013.01); *B60B 3/02* (2013.01); *B60B 21/04* (2013.01);
(Continued)

(58) Field of Classification Search
CPC .......... B60B 21/023; B60B 1/06; B60B 3/02; B60B 21/04; B60B 3/10; B60B 2310/542;
(Continued)

(56) References Cited

U.S. PATENT DOCUMENTS 2,596,345 A * 5/1952 Penrod ..................... C21D 9/34
134/123
4,767,473 A * 8/1988 Berg ........................ C21D 9/34
148/698
(Continued)

FOREIGN PATENT DOCUMENTS

CN 101821414 A 9/2010
CN 102102139 A 6/2011
(Continued)

OTHER PUBLICATIONS

Huang Xiaoqing "Stress Analysis and Fatigue Evaluation of Wheel Discs", Full-text Database of China Excellent Master's Thesis (Engineering Science and Technology Series II), No. 2, C035-43 (XX pages; with English machine translation).
International Search Report and Written Opinion for PCT/EP2020/060874 mailed Jul. 2, 2020 (10 pages; with English translation).

*Primary Examiner* — Ryan J. Walters
(74) *Attorney, Agent, or Firm* — Brooks Kushman P.C.

(57) ABSTRACT

The invention relates to a component in the form of a wheel comprising: a hub portion, a rim portion with an outer rim flange and an inner rim flange, a plurality of circumferentially distributed spokes extending between the hub portion and the rim portion, wherein the spokes and the hub portion are arranged offset with respect to a wheel center plane towards the outer rim flange and have an inner side facing the wheel center plane and an outer side directed away from the wheel center plane, wherein the outer rim flange has greater tensile residual stresses at least in a partial region than at least a partial region of the inner rim flange.

6 Claims, 5 Drawing Sheets

(51) Int. Cl.

| | |
|---|---|
| *B60B 21/02* | (2006.01) |
| *B60B 21/04* | (2006.01) |
| *C21D 1/62* | (2006.01) |
| *C21D 1/667* | (2006.01) |
| *C21D 9/34* | (2006.01) |
| *C22F 1/00* | (2006.01) |
| *C22F 1/04* | (2006.01) |
| *B60B 3/10* | (2006.01) |
| *C21D 9/00* | (2006.01) |

(52) U.S. Cl.
CPC ............... *C21D 1/62* (2013.01); *C21D 1/667* (2013.01); *C21D 9/34* (2013.01); *C22F 1/002* (2013.01); *C22F 1/04* (2013.01); *B60B 3/10* (2013.01); *B60B 2310/542* (2013.01); *C21D 9/0062* (2013.01)

(58) Field of Classification Search
CPC ...... B60B 2310/50; C21D 1/62; C21D 1/667; C21D 9/34; C21D 9/0062; C21D 1/613; C22F 1/002; C22F 1/04
See application file for complete search history.

(56) References Cited

U.S. PATENT DOCUMENTS

| | | | |
|---|---|---|---|
| 6,394,793 B1* | 5/2002 | Bunge | F27D 15/02 |
| | | | 266/259 |
| 7,182,909 B2* | 2/2007 | Rabinovich | C21D 1/667 |
| | | | 266/259 |
| 2003/0080605 A1* | 5/2003 | Coleman | B60B 3/005 |
| | | | 301/63.103 |

FOREIGN PATENT DOCUMENTS

| | | |
|---|---|---|
| CN | 108642264 A | 10/2018 |
| DE | 1933781 A1 | 1/1971 |
| DE | 3443226 C1 | 3/1986 |
| DE | 10234026 C1 | 11/2003 |
| DE | 102012103884 A1 | 11/2013 |
| EP | 1651788 B2 | 3/2014 |
| EP | 3162460 A1 | 5/2017 |
| GB | 1321287 A | 6/1973 |
| WO | 2005007917 A2 | 1/2005 |
| WO | 2008154680 A1 | 12/2008 |

* cited by examiner

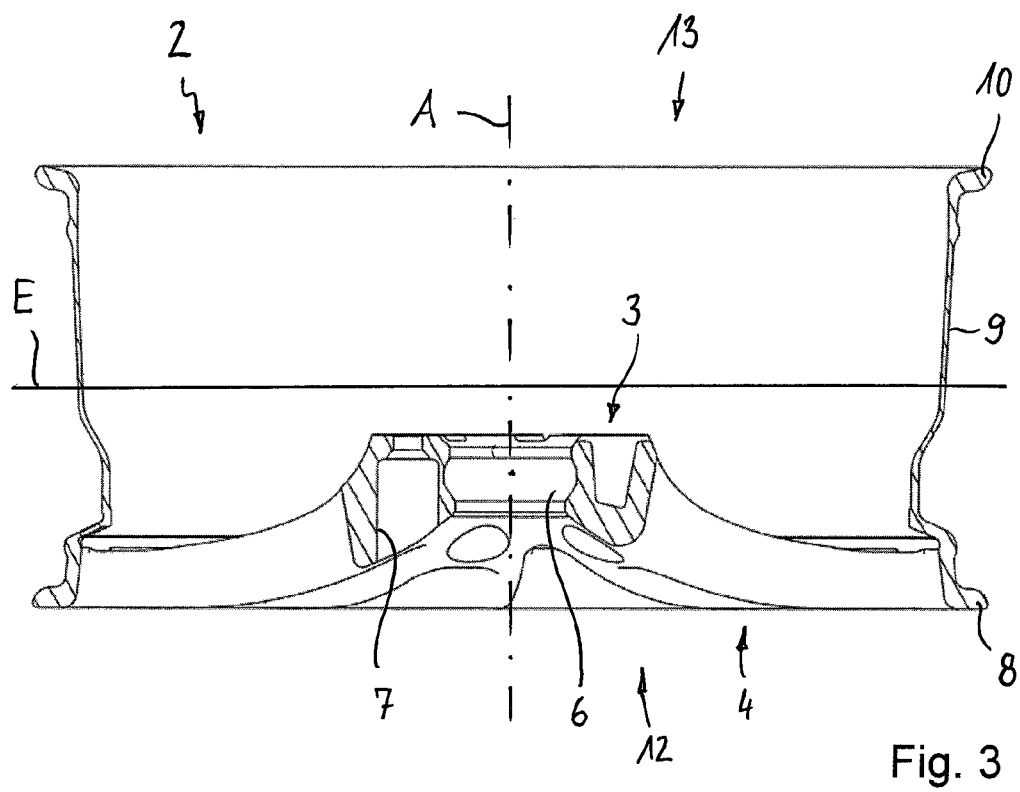
Fig. 3
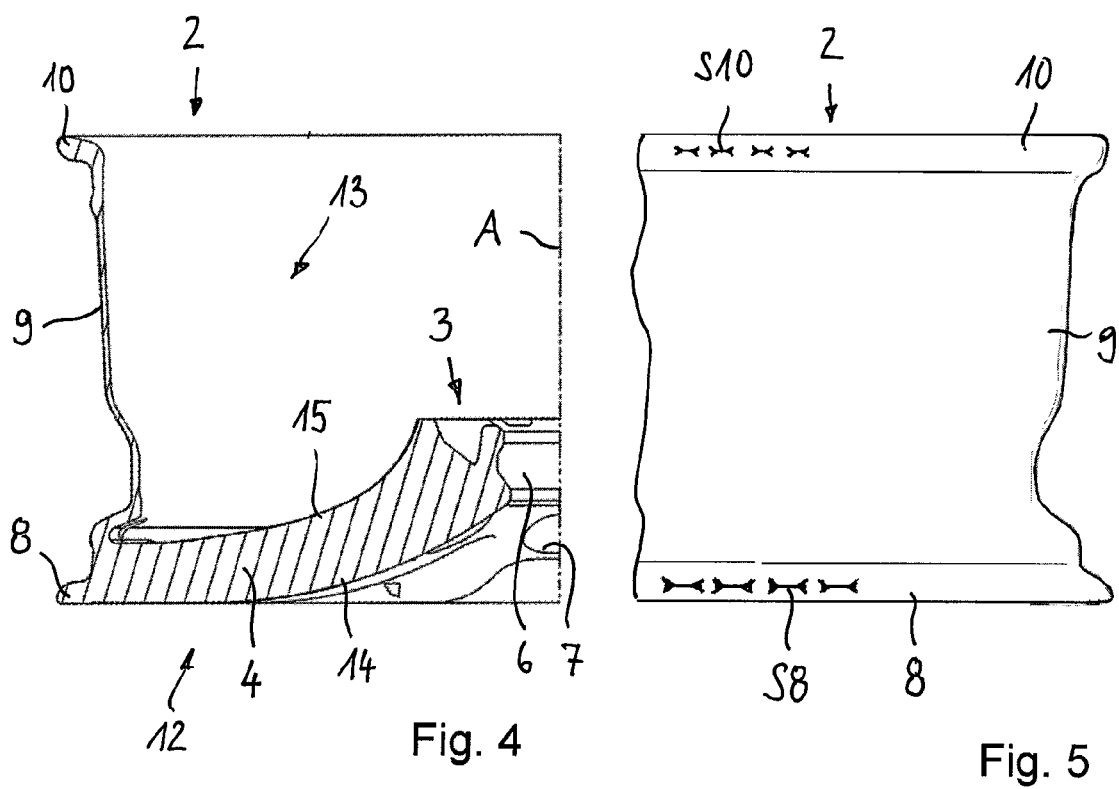
Fig. 4
Fig. 5

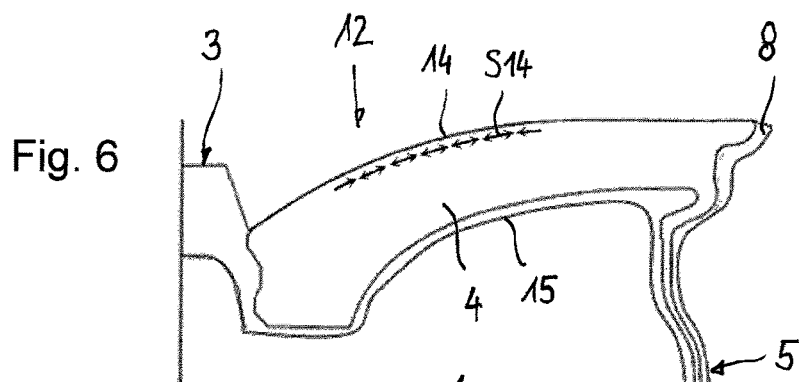
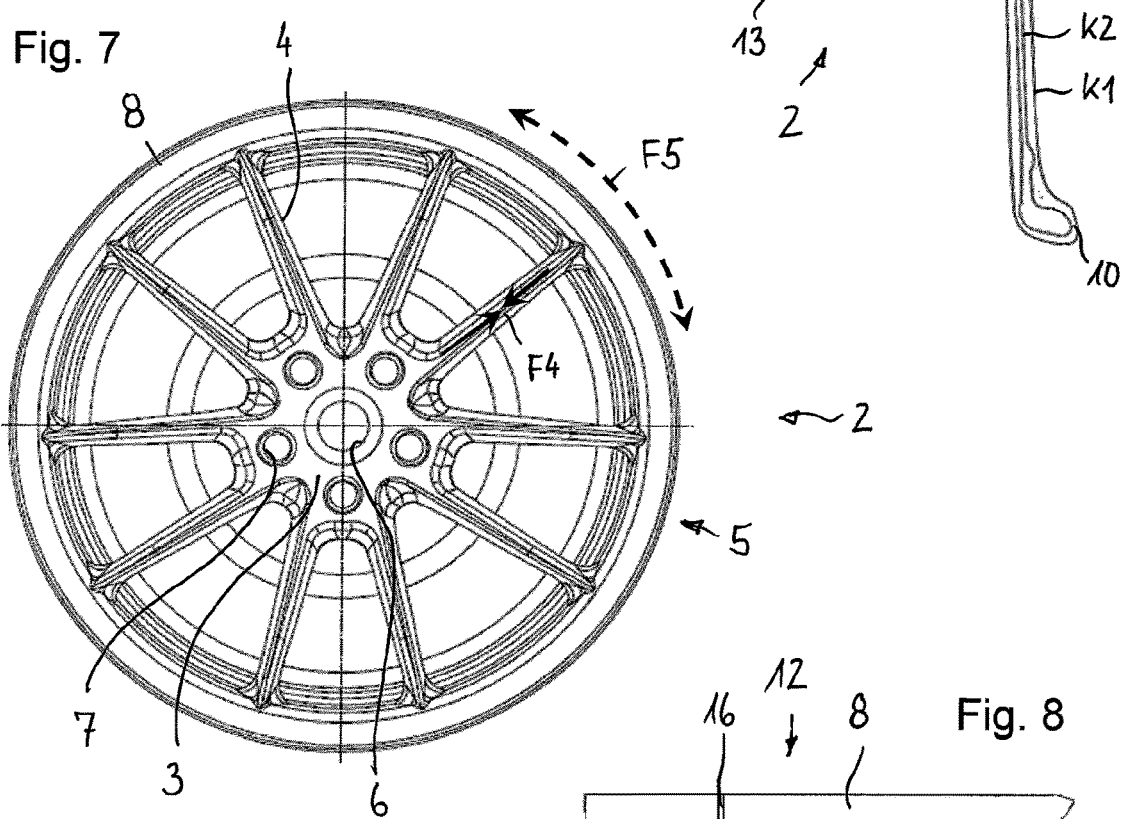
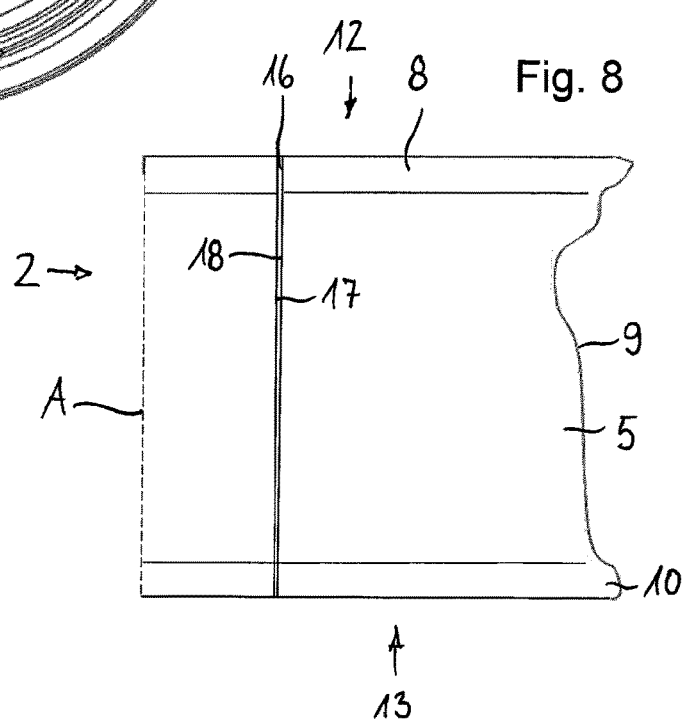

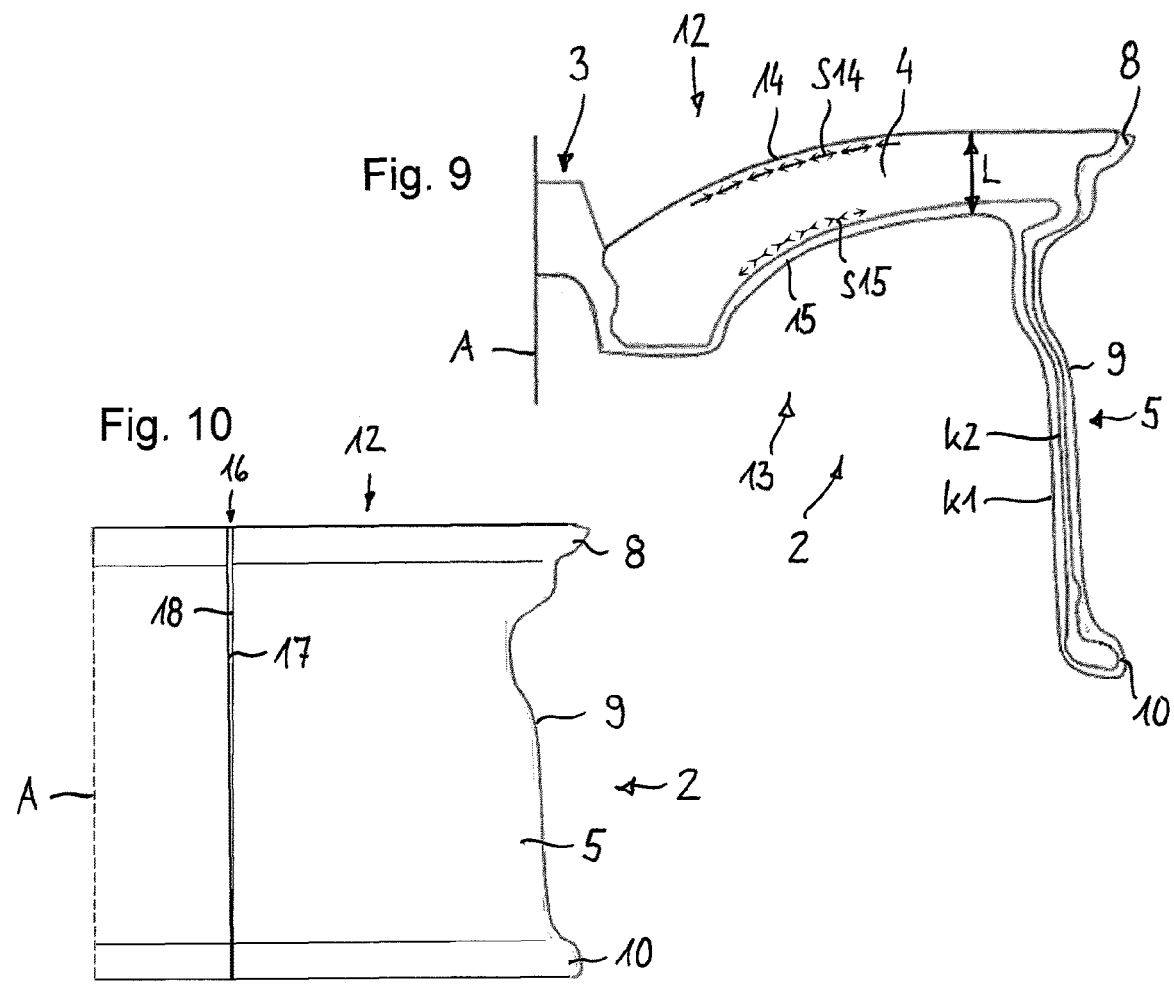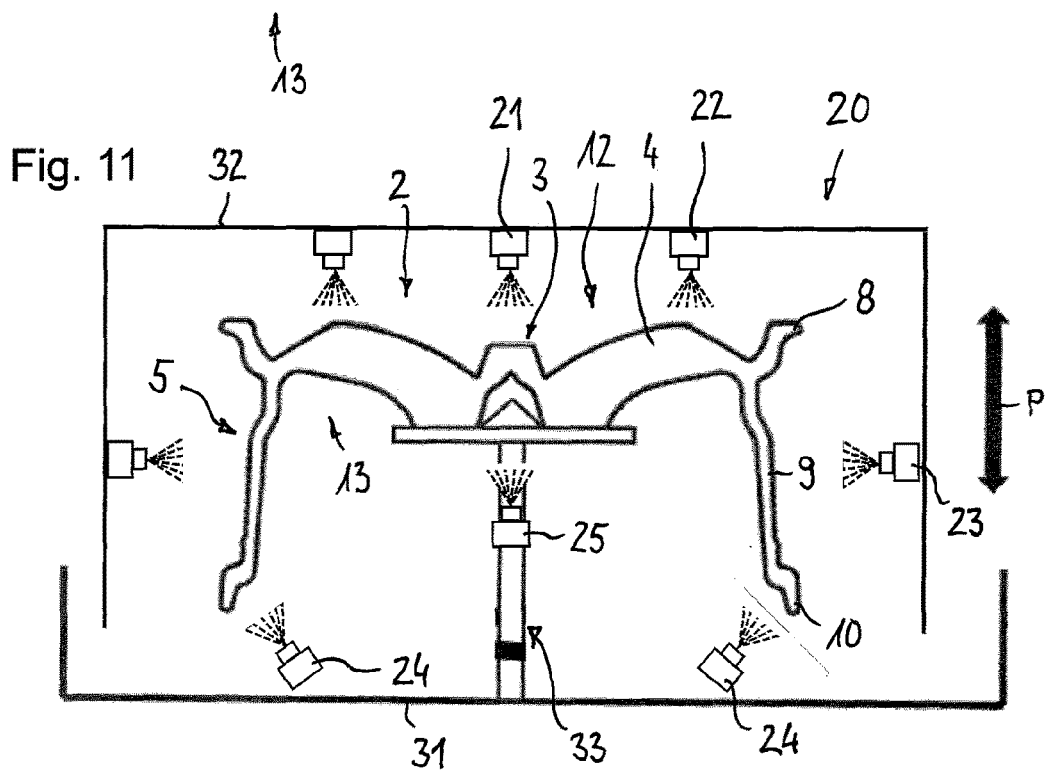

QUENCHING A WHEEL COMPRISING A HUB

CROSS-REFERENCE TO RELATED APPLICATIONS

This application is a national stage of, and claims priority to, Patent Cooperation Treaty Application No. PCT/EP2020/060874, filed on Apr. 17, 2020, which application claims priority to European Patent Application No. EP19169954.5, filed on Apr. 17, 2019, which applications are hereby incorporated herein by reference in their entireties.

BACKGROUND

From CN 108642264 A, a device and method are known for quenching a wheel having a hub, spokes and a running surface. The device has a spoke cooling nozzle for cooling the spokes and a plurality of circumferentially distributed running surface cooling nozzles for cooling the running surface of the wheel.

From DE 1 933 781 A1, a method and a device are known for partially quenching and tempering steel railway wheels. Quenching devices for the running surface and quenching devices for the blade and hub of a railway wheel are provided. Quick-opening valves are provided in the supply lines of the quenching devices, which can be controlled independently of one another by time control switches.

From U.S. Pat. No. 6,394,793 B1, a method and apparatus are known for quenching round engine components. The apparatus includes a plurality of concentrically arranged air quench tubes having a plurality of circumferentially distributed bores for directing compressed air to areas of the engine component for cooling. A radially inner quench tube for a radially inner thickened portion of the engine component and a radially outer quench tube for a radially outer thickened portion of the engine component are respectively provided above and below the engine component.

From DE 34 43 226 C1, a process is known for improving the dynamic strength of wheel discs of vehicle wheels made of age-hardenable aluminium alloys. The wheel discs are sprayed with a coolant which first affects the central area and then also the outer areas in such a way that a temperature gradient is formed inside the wheel in the radial direction. A spray device is arranged in the axis of the wheel, which is provided for cooling the inner region of the wheel, and further spray devices are arranged at the circumference of the wheel for cooling the outer region of the wheel.

From WO 2005/007917 A2, a process is known for quenching a light metal casting which is quenched by a gaseous quenching medium. In the case of castings with different wall thicknesses, slower cooling takes place in the casting regions of greater wall thickness which are remote from the inlet of the quenching medium. In a wheel, the hub region has a lower hardness than a horn region of the rim which has a lower wall thickness and faces the passages of the quenching medium. The strength distribution is continuous in a radial direction from an inner spoke region of lower strength to an outer spoke region of higher strength.

From DE 10 2012 103 884 A1, a method is known for casting a casting with a through-opening, in particular a cylinder crankcase of an internal combustion engine. After the molten metal has been poured into the casting mold, a through-channel is produced which leads through the through-opening and opens out on an outer side of the casting mold, and the casting is cooled in the casting mold with a cooling medium flowing through the channel. The cooling medium can be air or another gaseous medium, although the use of water vapor or an air/water vapor mixture is also described for cases with an increased minimum cooling rate.

From DE 102 34 026 C1, a low-pressure casting mold is known for producing round castings with lateral undercuts, in particular a vehicle rim.

From EP 3 162 460 A1, a light metal casting component made of a hypoeutectic cast aluminum alloy is known, which contains 3.5 to 5.0 weight percent silicon and 0.2 to 0.7 weight percent magnesium.

SUMMARY

The present disclosure relates to a component in the form of a wheel, and to a method and apparatus for quenching a component in the form of a wheel. The component in the form of a wheel has a particularly favorable residual stress distribution and thus has a long service life. Furthermore, a corresponding method and a device for quenching a component in the form of a wheel enable rapid cooling and produce a favorable residual stress distribution is in the component.

A component in the form of a wheel comprises: a hub portion; a rim portion having an outer rim flange and an inner rim flange, with a wheel center plane defined between the outer rim flange and the inner rim flange; and a plurality of circumferentially distributed spokes extending between the hub portion and the rim portion; wherein the spokes and said hub portion are arranged offset with respect to the wheel center plane toward the outer rim flange and comprise an inner side facing the wheel center plane and an outer side facing away from the wheel center plane; wherein, the outer rim flange shows, at least in a partial region thereof, tensile residual stresses effective in the circumferential direction which are greater than residual stresses effective in the circumferential direction in at least a partial region of the inner rim flange.

The expression "at least a partial region" means one, several, most, or all of the circumferential partial regions between two adjacent spokes respectively. The tensile residual stresses of the outer rim flange may be greater than the residual stresses of the inner rim flange in the same and/or another circumferential partial region. The residual stresses considered herein with respect to the outer and inner rim flanges refer in particular to the circumferential direction, although it will be understood that further residual stresses may occur in the radial or axial direction. Larger tensile residual stresses acting in the circumferential direction at least in a partial region of the outer rim flange relative to a partial region of the inner rim flange can be detected, for example, by the saw gap popping open when the rim bed, the inner rim flange and the outer rim flange are cut. After cutting open, the saw gap on the outer rim flange has opened up further than on the inner rim flange. The outer rim flange shows greater tensile residual stresses in particular over its entire circumferential extent than the inner rim flange. For example, an average value of the tensile residual stresses occurring in the outer rim flange over the circumference may be greater than an average value of the residual stresses occurring in the inner rim flange over the circumference. Alternatively or additionally, at least in circumferential partial regions located between two spokes respectively, the tensile residual stresses in the outer rim flange may be greater than the residual stresses in the inner rim flange. The outer rim flange may have circumferential partial regions free of residual stress in addition to circumferential partial regions subject to residual stress. The inner rim flange may have circumferential partial regions with tensile residual stresses, circumferential partial regions free of residual stresses and/or circumferential partial regions with compressive residual stresses.

Conversely, the feature that the tensile residual stresses in a partial region of the outer rim flange are greater than residual stresses in a partial region of the inner rim flange means that the residual stresses in the inner rim flange are less than the tensile residual stresses in the outer rim flange. In the context of the present disclosure, tensile residual stresses may be defined with a positive sign and compressive residual stresses may be defined with a negative sign. In this regard, the smaller residual stresses of the inner rim flange, compared to the respective tensile residual stresses of the outer rim flange, may be quantitatively smaller tensile residual stresses or compressive residual stresses, with residual stresses of zero are also being possible.

The spokes may have, at least in a portion, compressive residual stresses which occur in particular in the radial direction. In particular, the spokes may have greater compressive residual stresses in an edge layer of the outer side than in an edge layer of the inner side. As a result of the greater residual compressive stresses in the region of the outer sides of the spokes compared to the inner side, the wheel has only a slight overall distortion. In addition, particularly good mechanical properties are achieved in the region of the outer sides of the spokes, resulting in an overall long service life of the wheel. In the context of the present disclosure, the term residual stresses includes mechanical stresses which prevail in the component when no external forces act thereon and which is in thermal equilibrium. Residual stresses can arise during the manufacture of a component, for example in the course of heat treatment, or can be deliberately generated by mechanical treatment or by heat treatment. In the present case, the residual stresses refer to the unloaded state of the wheel.

The wheel may be made in one piece or in multiple pieces. The wheel or parts thereof may be manufactured, for example, as a casting, that is by casting a casting material in a casting die, as a forging, that is by forging a forging blank in a forging die, or as a milled part, that is by milling from a milling blank. When producing a one-piece wheel, the rim spider and rim bed are integrally formed. Suitable materials include, for example, light metal alloys which may include, for example, aluminum as the main alloy component. However, any other metallic casting materials or forging materials are possible. The wheel includes the rim portion for receiving the tire, the hub portion, and the wheel spokes. The hub and the spokes can also be referred to jointly as the wheel disc or wheel spider. The wheel spider is used to centrally attach the wheel to a vehicle hub. In the case of a multi-piece wheel, the wheel spider and the rim are initially produced separately and subsequently joined to one another, for example by means of force-fitting, form-fitting and/or material-fitting connections.

In the context of the present disclosure, a feature is described for an or the spoke, it will be understood that this may apply equally to any further spoke. The spokes have, at least in a partial region, greater compressive residual stress on the outer side than on the inner side. By partial region, in this context, is meant in particular a radial section of the spoke which accordingly has a greater residual compressive stress on the outer side than on the inner side. According to a possible embodiment, the spokes may be configured to have greater residual compressive stresses in the edge layer of the outer side than in the edge layer of the inner side, at least over half their radial extension and/or over their entire radial extension. In this case, the edge layer of the outer side which is under compressive residual stresses may extend, starting from an outer end face of the spokes, over at least 10%, in particular over at least 20%, in particular over at least 30% of the axial thickness of the spokes. According to an embodiment, the compressive residual stresses may also extend over the entire thickness of the spokes up to the inner side, thereby decreasing from the outer side to the inner side. Alternatively, the wheel may be configured such that tensile residual stresses are present in the edge layer of the inner side. Such tensile residual stresses may be present starting from the inner surface of the spokes, for example, over a depth of up to 30% of the axial thickness of the spokes.

According to a possible embodiment, the spokes are overall compressively loaded between the rim portion and the hub portion in the unloaded state of the wheel. This means that the forces acting from the rim on the spokes from radially outside are directed radially inwards, whereas the forces acting from the hub on the spokes from radially inside are directed radially outwards. Overall, the spokes are thus under radial compressive load, whereas the rim is under tensile load in the circumferential direction. Such a load condition can be determined, for example, by means of the free-cutting method. In this case, the rim bed between two adjacent spokes is cut open axially. When the spokes are under compressive load, respectively the rim portion is under tensile load, the cut-open ends of the rim bed spring open. In the present disclosure, the indications radial, axial and circumferential refer to the axis of the wheel, unless otherwise stated.

The rim portion is configured such that the outer rim flange has greater tensile residual stresses than the inner rim flange. For example, the tensile residual stresses of the inner rim flange may be more than 10 percent lower than those of the outer rim flange. The tensile residual stresses may decrease, as viewed in longitudinal section through the rim, from the outer rim flange through the rim bed to the inner rim flange. As the rim portion is under tensile residual stresses over its entire axial length, with greater tensile residual stresses at the outer rim flange than at the inner rim flange, the free-cutting method results in a slightly V-shaped gap.

A solution to the above problem further comprises a method of quenching a component, the component configured in the form of a wheel including a hub portion, a rim portion, and a plurality of circumferentially distributed spokes extending between the hub portion and the rim portion, with the rim portion having an outer rim flange and an inner rim flange between which a central rim plane is defined, with the spokes and the hub portion being offset with respect to the central rim plane towards the outer rim flange and having an inner side facing the central rim plane and an outer side facing away from the central rim plane, with the following quenching sequence of the method: quenching of the spokes before quenching of the hub portion. This quenching sequence provides the outer rim flange with greater tensile residual stresses in the circumferential direction than the inner rim flange. The quenching of the spokes relates in particular to an area radially between the hub portion and the rim portion. The outer side and/or the inner side of the spokes may be quenched. This also applies to the hub portion.

An advantage of the quenching process described is that the components produced this way have particularly low distortion, high strength and a long service life. In this respect, the advantages of the process and the advantages of the component produced according to the process are interrelated. In this context, it is understood that all the features and advantages mentioned in connection with the product also apply to the process, and vice versa.

In the context of the present disclosure, to the extent that a quenching sequence of different regions of the component is referred to, this is intended to refer in particular to the starting time of the quenching. That is, quenching of a subsequent region may occur with a time offset and/or in partially overlapping time with a preceding region. In the case of time offset, the quenching of the next region does not start until the quenching of the previous region has been completed. In the case of process control with overlapping times, it is provided that the quenching for a first region begins temporally before the quenching of a second region, but subsequently both regions are further quenched temporally overlapping until the respective desired target temperature is reached.

The spokes and/or inner rim flange may be quenched first. Quenching of the inner rim flange may be started before quenching of the hub portion and/or rim bed. The hub portion may be quenched before the rim bed. These embodiments, individually or in combination, help to create circumferentially acting tensile residual stresses in the region of the inner rim flange. The hub portion may be quenched inside and outside, and quenching of the inner side of the hub portion may begin before, simultaneously with, or after quenching of the outer side of the hub portion. The outer side of the hub portion and the region of the inner rim flange may be quenched simultaneously or with a small time offset. The quenching of the rim bed can be started after the quenching of the spokes, the outer rim flange and/or the inner side of the rim portion.

The quenching of the individual regions can be carried out with separately controllable cooling respectively quenching units, wherein several units can be arranged distributed over the circumference in each case. For example, the quenching can be carried out with at least four, five, in particular with at least seven or even more than nine separately controllable quenching units. The wheel can be held stationary or rotated during quenching in order to achieve a particularly uniform cooling respectively quenching behavior over the circumference.

The medium used for quenching can be steam or a liquid-gas mixture, in particular quenching can be carried out by means of water or by means of an air-water mixture. The quenching is carried out with high pressures, for example with a nozzle pressure of at least 30 bar, in particular at least 80 bar or even above 100 bar. The quenching may be carried out at high cooling rates, for example at least 75 K/s, in particular at least 90 K/s or even more than 100 K/s. Prior to quenching, the component may be subjected to solution annealing. Quenching may be carried out, for example, until approximately the ageing temperature is reached. In particular, the component may be quenched until the temperature is less than 1.1 times and greater than 0.9 times the ageing temperature. For example, the ageing temperature may be between 150° C. and 200° C. After ageing, the wheel may be cooled to room temperature, in particular by means of water.

An apparatus for quenching a component in the form of a wheel has a hub portion, a rim portion, and a plurality of circumferentially distributed spokes extending between the hub portion and the rim portion, with the spokes and the hub portion having an outer side and an inner side, comprises: at least one cooling unit for quenching the hub portion; at least one cooling unit for quenching the spokes; wherein the cooling units are configured to respectively spray a cooling medium onto the wheel; and a control unit configured to control the cooling units independently of each other in time.

The sequence of actuation of the cooling units can be adjusted as required by the stress distribution to be produced, for example as described in connection with the process. An advantage of the quenching device described is that the components quenched therewith have a particularly low distortion and a long service life. In this respect, the advantages of the device, those of the method and the component produced in accordance with the method or the device interrelate with each other. In this context, it is understood that all the features and advantages mentioned in connection with the product and the process also apply mutatis mutandis to the device, and vice versa.

More specifically, at least one cooling unit for quenching the outer side of the spokes, at least one cooling unit for quenching the inner side of the spokes, at least one cooling unit for quenching the outer side of the hub and/or at least one cooling unit for quenching the inner side of the hub may be provided. Further cooling units may be provided, in particular at least one cooling unit for quenching the inner rim flange, a cooling unit for quenching the inner circumferential face of the rim and/or a cooling unit for quenching the outer rim flange. The cooling units for quenching the inner rim flange may comprise a plurality of sub-units, in particular a unit for quenching the outer side of the inner rim flange and/or a unit for quenching the inner side of the inner rim flange.

The quenching device may comprise a first device part on which a first subset of the cooling units is arranged, and one or more second device parts movable relative to the first device part on which a second, respectively further subset of the cooling units is arranged. For example, all of the cooling units serving to cool the outer side of the wheel may be associated with one device part, and all of the cooling units serving to cool the inner side of the wheel may be arranged on the other device part. The two device parts may be configured to be movable relative to each other, that is, one relative to the other, or vice versa, or both. The two device parts may be configured in a housing-like manner, so that in the closed state the wheel is accommodated in the cavity thus formed. The device part on which the wheel is held may comprise a rotating unit for rotating the wheel.

BRIEF SUMMARY OF THE DRAWINGS

Exemplary embodiments are explained below with reference to the figures of the drawings. Herein:

FIG. 3 shows the wheel according to section line III-III of FIG. 2;

FIG. 4 shows the wheel according to section line IV-IV of FIG. 2;

FIG. 5 shows the wheel of FIG. 1 in radial view with residual stresses drawn on the inner and outer rim flange;

FIG. 6 schematically shows the residual stress distribution in an edge layer of the outer side of a spoke;

FIG. 7 shows the wheel with residual stresses in the region of a spoke and a rim portion;

FIG. 8 shows the wheel in FIG. 1 in a radial view with the rim bed cut open;

FIG. 9 shows a wheel in a modified embodiment in semi-longitudinal section with residual stress distribution schematically drawn in the edge layer of the outer side and the inner side of a spoke;

FIG. 10 shows the wheel of FIG. 9 in a radial view with the rim bed cut open;

FIG. 11 shows a device for quenching a wheel, in a schematic longitudinal section;

DESCRIPTION

Figure 1:
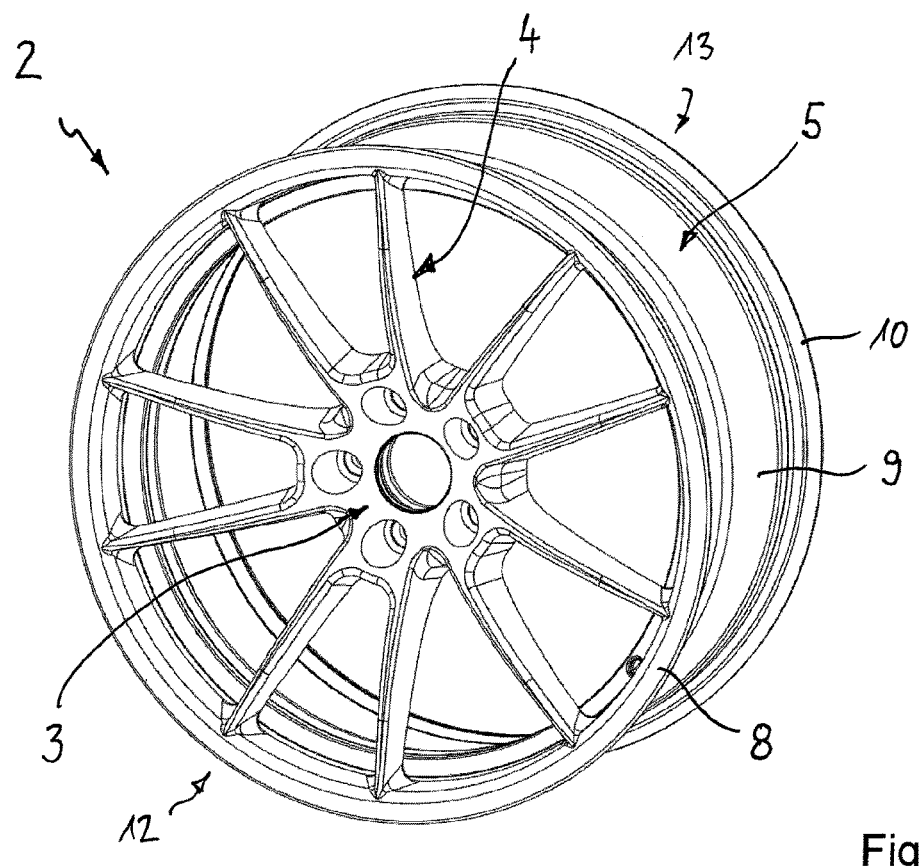
FIG. 1 shows a wheel in perspective view from obliquely outside.
Figure 2:
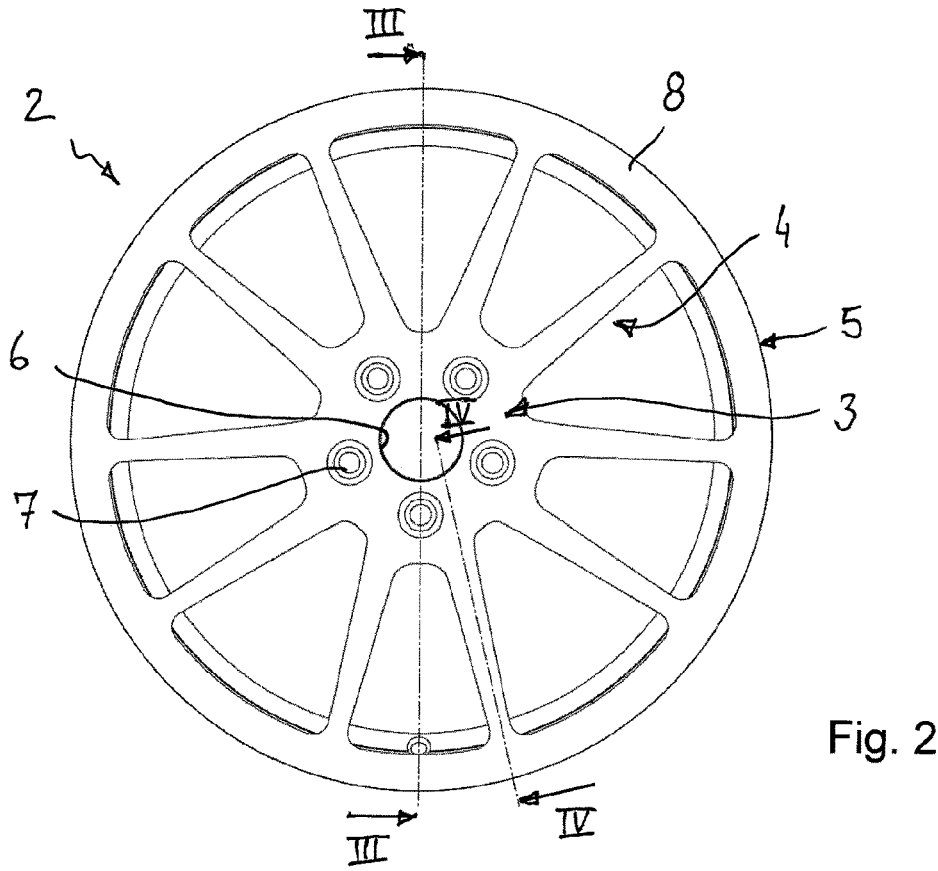
FIG. 2 shows the wheel of FIG. 1 in axial view.

FIGS. 1 to 10, which are described together below, show an exemplary component in the form of a wheel 2.

The wheel 2 has a hub portion 3, circumferentially distributed spokes 4 connecting thereto and a rim portion 5. The hub portion 3 serves for centering and fastening the wheel 2 to a vehicle wheel hub. For this purpose, the hub portion 3 has a central centering hole 6 and a plurality of circumferentially distributed through holes 7, which jointly are also referred to as a hole circle and through which respective fasteners can be inserted. According to an alternative embodiment, instead of a hole circle, the hub may also be configured with only one central hole for centering and simultaneous fastening. The rim portion 4, also referred to as the rim for short, is configured to receive a tire. The rim 4 comprises an outer rim flange 8, a rim bed 9 and an inner rim flange 10. The wheel 2 has an axis A about which it can rotate in a mounted condition.

In particular, it can be seen in FIG. 3 that the hub portion 3 and the spokes 4, together also referred to as the wheel spider, are offset with respect to a wheel center plane E lying between the two rim flanges 8, 9. The wheel 2 has an outer side 12 which is visible when the wheel is mounted, and an inner side 13 which faces the vehicle when the wheel is mounted.

FIG. 4 shows a half-longitudinal section through a spoke 4 of the finished component. FIG. 5 shows the rim 2 in a radial view with schematically drawn residual stresses S8 in the outer rim flange 8 and schematically drawn residual stresses in the inner rim flange 10. FIG. 6 shows the residual stress distribution in an edge layer of the outer side 12 of a spoke 4, wherein the outer contour K1 in FIG. 5 represents the raw component with production oversize, while the inner contour K2 represents the contour of the finished component. All the features described herein can refer both to the raw component, for example a raw casting or a raw forging, and to the finished machined component.

As can be seen in particular from FIG. 5, the wheel 2 is produced such that the outer rim flange 8 and the inner rim flange 10 respectively have, at least in partial regions, tensile residual stresses effective in the circumferential direction about the longitudinal axis A, which are shown schematically by small arrows S8, S10. It is provided that the tensile residual stresses S8 of the outer rim flange 8 are greater than the tensile residual stresses S10 of the inner rim flange 10. It is understood that the outer rim flange 8 can have tensile residual stresses only in circumferential partial regions and can be free of residual stresses in others and/or that the inner rim flange 10 can be free of residual stresses or be subject to compressive residual stresses at least in circumferential partial regions. In this case, the tensile residual stresses of the outer rim flange 8 are greater than the residual stresses of the inner rim flange 10, at least in a circumferential partial region.

It can further be seen in FIG. 6 that the spokes 4 have compressive residual stresses in the radial direction in at least one edge layer 14 of the outer side 12, which are shown by small arrows S14. It is provided that the compressive residual stresses in the edge layer 14 of the outer side 12 are greater than in the edge layer 15 of the inner side 13. This may relate to a section of the radial extension of a respective spoke 4 or to the entire radial extension of the spoke. It is possible that the compressive residual stresses vary over the radial extension of the spokes 4. In the unloaded state, preferably the edge layer 14 of the entire outer side 12 of the spokes 4 is subject to compressive residual stress and/or is free of tensile residual stress.

In the present embodiment, not only sections of the spokes 4 are subjected to compressive residual stresses, but the entire spokes as such are each subjected to compressive stresses. In other words, according to a theoretical model, the spokes are clamped between the hub portion 3 and the rim ring 5, that is, forces directed radially outwardly from the hub portion 2 act on the inner ends of the spokes 4, while forces directed radially inwardly from the rim ring 5 act on the outer ends of the spokes 4. This applies at least to an edge layer of the outer side 12. In an edge layer of the inner side 13, lower compressive residual stresses are present than in the edge layer of the outer side 12, wherein tensile residual stresses may also be present here. Overall, the spokes 4 are thus under radial compressive load, at least in the region of the outer side 12, whereas the rim 5 is under tensile load in the circumferential direction. These load conditions are shown in FIG. 7, in which, by way of example, the compressive load in a spoke 4 is represented by arrows F4 acting towards each other and the tensile load in the rim 5 is represented by dashed arrows F5 pointing away from each other.

Such a load condition can be determined, for example, by means of the free-cutting method. In this case, the rim bed 9 is axially cut open between two spokes 4 adjacent in the circumferential direction. When the rim portion 5 is under tensile load in the circumferential direction, and/or the spokes 4 are under compressive load, the cut-open ends of the rim portion 5 spring open. FIG. 8 shows the wheel 2 in radial view with the rim portion 5 cut open. The slit 16 created by the springing open of the free-cut rim segments 17, 18 is clearly visible. The slot 16 opens from the inner rim flange 10 in an axial direction towards the outer rim flange 8. This means that the tensile residual stresses S8 at the outer rim flange 8 are greater, respectively were greater before cutting, than the residual stresses 10 (compressive or tensile residual stresses) of the inner rim flange 8.

FIGS. 9 and 10 show a component for a wheel 2 in a modified embodiment. This corresponds to a wide extent to the embodiment according to FIGS. 1 to 8, to the description of which reference is made in this respect. The same details are provided with the same reference signs as in the above figures.

In common with the above embodiment, the wheel 2 shown in FIGS. 9 and 10 has residual compressive stresses S14 in the edge layer of the outer side 14 of the spokes 4. In contrast, the spokes 4 in the edge layer 15 of the inner side 13 are under tensile residual stresses S15. The wheel 2 has a variable residual stress distribution over the axial extension L of the spokes 4, which changes from compressive residual stresses S14 to tensile residual stresses S15 starting from the edge layer 14 of the outer side 12 to the edge layer 15 of the inner side 13. Inside the spokes 4 is a residual stress-free transition layer, in which the stresses change from compressive to tensile residual stresses. In this embodiment, as a theoretical model, the spokes 4 are clamped in the outer edge layer 14 between the hub portion 3 and the rim ring 5. Consequently, on the axially outer side 12 of the wheel 2, radially outwardly directed forces act from the hub portion 3 on the radially inner ends of the spokes 4, while radially inwardly directed forces act from the rim ring 5 on the radially outer ends of the spokes 4. In contrast, tensile residual stresses S15 are present in the edge layer 15 of the inner side 13, that is, on the axially inner side of the rim spider, forces directed radially inwardly act from the hub portion 3 on the radially inner ends of the spokes 4, while forces directed radially outwardly act from the rim ring 5 on the outer ends of the spokes 4. Overall, the spokes are thus under radial compressive load in the region of the outer side 14 and under radial tensile load in the region of the inner side 13. Accordingly, the rim portion 5 is subjected to tensile loading in the circumferential direction in the region of the outer rim flange 8, while it is subjected to compressive loading in the circumferential direction in the region of the inner rim flange 10.

In this embodiment with the residual stresses mentioned, the result of cutting free the rim bed 5 in the circumferential region between two spokes 4 is that the cut-free ends 17, 18 of the rim bed spring open in the axial region of the outer rim flange 8, while they approach each other in the axial region of the inner rim flange 10. Overall, this embodiment results in a gap 16 tapering from the outer rim flange 8 towards the inner rim flange 10, as shown in FIG. 10, whereby the opening angle of the gap is greater here than in the above embodiment.

For both embodiments described above, the material used for the wheel may be, for example, a light metal such as aluminum or an aluminum alloy or magnesium or a magnesium alloy, without being limited thereto. For example, a cast aluminum alloy may comprise at least 93.0 weight percent aluminum, 3.5 to 5.0 weight percent silicon, 0.2 to 0.7 weight percent magnesium, and optionally other alloying elements of up to 1.5 weight percent.

After the blank has been produced, for example by casting, forging or milling, it is heat treated, in particular subjected to a solution annealing. After the heat treatment, the component is quenched, wherein the component 2 can be precooled after the solution annealing and before the quenching. The quenching is carried out in particular such that the desired residual stress distribution is produced in the component.

FIG. 11 shows a device 20 according to the invention for quenching a component in the form of a wheel 2. It can be seen that the device 20 comprises a plurality of cooling units 21, 22, 23, 24, 25 for quenching the wheel 2. In the present embodiment, at least one cooling unit 21, 25 for quenching the hub 3; at least one cooling unit 22 for quenching the spokes 4; at least one cooling unit 23 for quenching the outer sides 12 of the rim 5; and at least one cooling unit 24 for quenching the inner rim flange 10 are provided. There may further be provided at least one cooling unit for quenching the outer rim flange 8 and/or at least one cooling unit for quenching the inner side 13 of the rim 5 (not shown).

The cooling units 21, 22, 23, 24, 25 are configured to respectively spray a cooling medium onto the wheel. They are separately controllable by a control unit (not shown) with respect to the start and duration of the cooling and, optionally, at least one further parameter influencing the quenching effect, such as temperature or pressure of the cooling medium. The cooling medium used is, for example, steam or a liquid-gas mixture, in particular water or a water-air mixture. The cooling units 21, 22, 23, 24, 25 comprise corresponding nozzles through which the spray mist is sprayed onto the component 2 at high pressures. In this respect, the quenching can be carried out with high nozzle pressures of at least 30 bar, in particular at least 80 bar. High cooling rates of at least 75 K/s, in particular with at least 90 K/s or even more than 100 K/s can be achieved with the device 20.

It can be seen that the quenching device 20 comprises a first device part 31 on which the cooling units 24, 25 are arranged that act on the inner side 13 of the wheel 2, and a second device part 32 on which the cooling units 21, 22, 23 are arranged that act in a cooling manner on the outer side 12 of the wheel 2. In the present embodiment, the second device part 32, which may also be referred to as the upper part, is configured to be axially movable relative to the first device part 31, which may also be referred to as the lower part, as indicated by the arrow P on the right-hand side. The two device parts 31, 32 are configured in a housing-like manner. The wheel 2 is placed on a support element 33 of the first device part 31, then the upper device part 32 is lowered towards the wheel 2 until the desired distance is reached. Finally, the quenching process begins. The lower device part 31 may comprise a rotating unit for rotationally driving the wheel 2 during quenching.

The cooling units for quenching the wheel 2 may, for example, be actuated in the following order: the cooling units 22 for cooling the outer side 12 of the spokes 4 before the cooling units 21 of the hub portion 3, then the cooling units 22 for cooling the inner side 13 of the hub portion 2, then the cooling units 25 for cooling the inner side 13 of the rim bed 9 and/or of the hub portion 3, and then the cooling units 23 for cooling the outer side 12 of the rim bed 9. The cooling units 24 for cooling the inner rim flange 10 can be activated in time with the cooling of the outer side 12 of the spokes 4, timely before the cooling units 21, 25 of the hub portion 2 and/or before the cooling units 23 of the rim bed.

The cooling respectively quenching with the individual cooling units starts in the above-mentioned sequence, but can then continue at least partially with time overlap of the individual cooling units, namely respectively until the desired target temperature is reached in the wheel region to be cooled. Quenching may be carried out for example until the ageing out temperature is reached. After ageing, the wheel can be cooled to room temperature, in particular by means of water.

Figure 12:
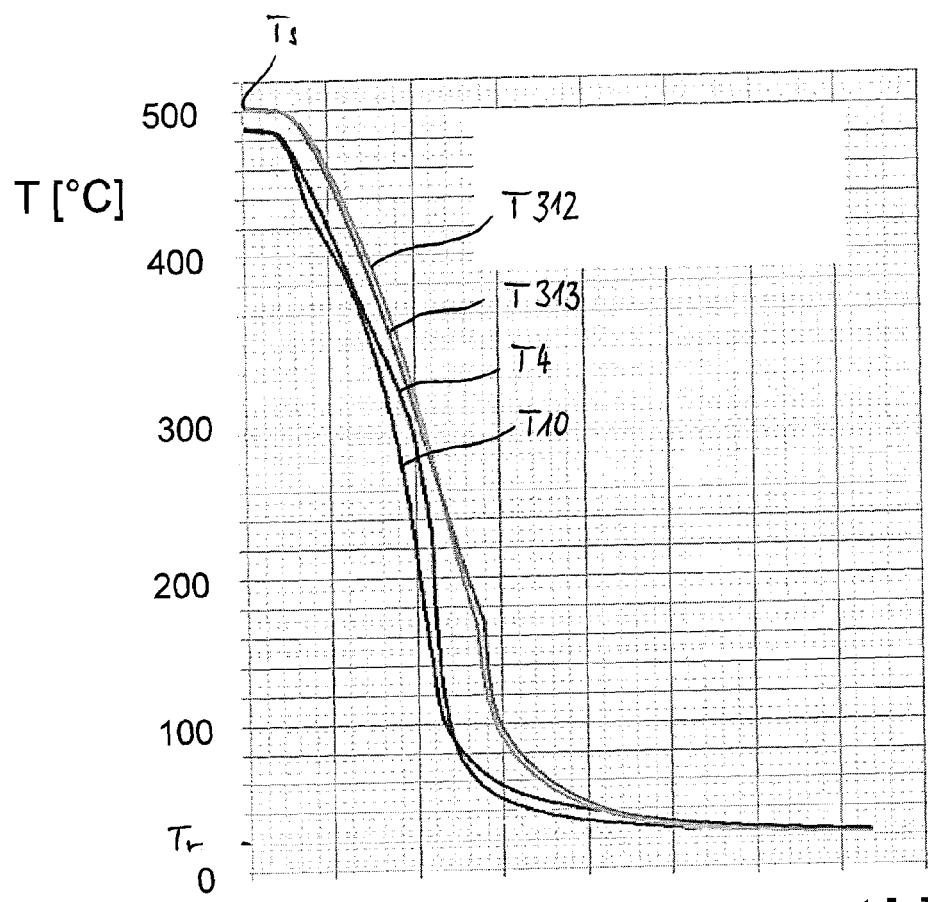
FIG. 12 shows a time-temperature diagram during quenching according to the invention.

FIG. 12 shows a time-temperature diagram during quenching according to the invention from the initial temperature Ts after solution annealing to the room temperature T. The time is plotted on the x-axis, the temperature T is plotted on the y-axis. Four curves are drawn, namely a first one for temperature T312 in the area of hole circle 3 on the outer side 12, a second one for temperature T313 in the area of hole circle 3 on the inner side 13, a third one for temperature T4 in a spoke 4 and a fourth one for temperature T10 at the inner rim flange 10. It can be seen that the four curves run adjacent to each other and substantially equidistant to each other, that is to say that the maximum temperature differences occurring in the wheel 2 at a respective time are particularly small. This leads overall to low residual stresses, respectively a favorable distribution of residual stresses in the wheel 2, which in turn contributes to a long service life.

Figure 13:
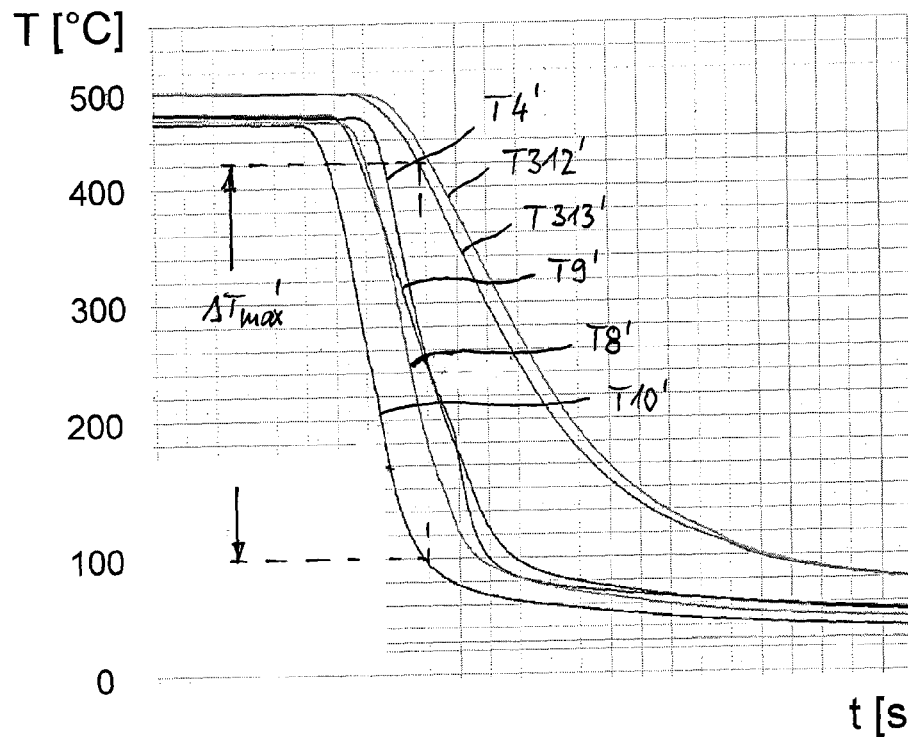
FIG. 13 shows a time-temperature diagram during quenching not according to the invention.

Compared with this, FIG. 13 shows a time-temperature diagram during quenching for a conventional quenching process, i.e. not according to the invention, in a water bath. Six curves are drawn, namely a first one for the temperature T312' in the area of the hole circle on the outer side, a second one for the temperature T313' in the area of the hole circle on the inner side, a third one for the temperature T4' in a spoke and a fourth one for the temperature T10' at the inner rim flange, a fifth one for the temperature T8' at the outer rim flange and a sixth one for the temperature T9' at the rim bed. It can be seen that the six curves fall at different times, meaning that cooling starts at different times in the different areas. In addition, starting from the starting temperature Ts (approximately solution annealing temperature), the temperature curves diverge significantly from one another as time increases. These two facts lead to particularly high maximum temperature differences ΔTmax' in wheel 2 and thus to high residual stresses in wheel 2.

LIST OF REFERENCE SIGNS

- 2 wheel
- 3 hub portion
- 4 spokes
- 5 rim portion
- 6 center hole
- 7 through holes
- 8 outer rim flange
- 9 rim bed
- 10 inner rim flange
- 12 outer side
- 13 inner side
- 14 edge layer
- 15 edge layer
- 16 slit
- 17 cut-free end
- 18 cut-free end
- 20 device
- 21-25 cooling units
- 31 device part
- 32 device part
- 33 support element
- A axis
- E plane
- K contour
- L extension
- P arrow
- S residual stress
- T temperature
- t time

The invention claimed is:

1. A method of quenching a component,
   wherein the component is configured in form of a wheel comprising a hub portion, a rim portion, and a plurality of circumferentially distributed spokes extending between the hub portion and the rim portion,
   wherein the rim portion comprises an outer rim flange, a rim bed and an inner rim flange, with a wheel center plane defined between the outer rim flange and the inner rim flange,
   wherein the spokes and the hub portion are arranged offset with respect to the wheel center plane towards the outer rim flange and have an inner side facing the wheel center plane and an outer side facing away from the wheel center plane,
   wherein the method comprises:
   quenching the spokes; and
   then quenching the hub portion after quenching the spokes has started.

2. The method of claim 1,
   wherein the method comprises: quenching the hub portion and then quenching the rim bed after quenching the hub portion has started.

3. The method according to claim 2,
   wherein quenching is carried out with a pressure of at least 30 bar.

4. The method according to claim 1,
   wherein the method comprises: quenching the inner rim flange and then quenching the rim bed after quenching the inner rim flange has started.

5. The method according to claim 1,
   wherein quenching is carried out by a liquid-gas mixture.

6. The method according to claim 1,
   wherein quenching is carried out with at least four separately controllable cooling units which are controlled in time sequence.

* * * * *